United States Patent [19]

Teraoka

[11] Patent Number: 5,017,183
[45] Date of Patent: May 21, 1991

[54] POWER TRANSMISSION APPARATUS

[75] Inventor: Masao Teraoka, Tochigi, Japan

[73] Assignee: Tochigifujisangyo Kabushi Kaisha, Japan

[21] Appl. No.: 339,080

[22] Filed: Apr. 17, 1989

[30] Foreign Application Priority Data

Apr. 22, 1988 [JP] Japan .................................. 63-99793

[51] Int. Cl.⁵ ........................ F16H 1/38; B60K 17/344
[52] U.S. Cl. ..................................... 475/150; 475/152;
475/156; 475/206; 475/210; 475/231; 475/242;
475/249; 475/342; 180/248
[58] Field of Search ....................... 74/665 T, 665 GA;
475/220, 224, 225, 231, 236, 249, 323, 150-156,
221, 242, 251, 329, 330, 341, 342, 206, 210;
180/247, 248, 249, 233; 310/83

[56] References Cited

U.S. PATENT DOCUMENTS

| 1,991,094 | 2/1935 | Higley | 475/152 X |
| 4,074,591 | 2/1978 | Dick | 475/249 |
| 4,404,867 | 9/1983 | Müeller et al. | 74/665 GA |
| 4,519,272 | 5/1985 | Meier | 475/150 |
| 4,627,513 | 12/1986 | Tutzer | 180/233 X |
| 4,633,735 | 1/1987 | Sakurai et al. | 180/247 X |
| 4,702,341 | 10/1987 | Taga et al. | 180/249 |
| 4,805,486 | 2/1989 | Hagiwara et al. | 475/231 X |

FOREIGN PATENT DOCUMENTS

| 0247820 | 5/1987 | European Pat. Off. |  |
| 0248582 | 5/1987 | European Pat. Off. |  |
| 46-35772 | 12/1971 | Japan . |  |
| 50-53 | 1/1975 | Japan . |  |
| 55-40334 | 3/1980 | Japan | 74/665 GA |
| 55-72420 | 5/1980 | Japan . |  |
| 56-43031 | 4/1981 | Japan . |  |
| 60-104426 | 6/1985 | Japan . |  |
| 62-165032 | 7/1987 | Japan . |  |
| 62-214021 | 9/1987 | Japan . |  |
| 63-97433 | 4/1988 | Japan | 180/248 |

Primary Examiner—Allan D. Herrmann
Assistant Examiner—Benjamin Levi
Attorney, Agent, or Firm—Samuels, Gauthier & Stevens

[57] ABSTRACT

To restrict and further promote differential rotation between first and second output shafts, the power transmission apparatus for differentially transmitting a rotative power supplied to an input shaft to two output shafts comprises a differential gear mechanism coupled between the two output shafts; a multiplying mechanism associated with the differential gear mechanism, for detecting and multiplying a differential rotation; a motor coupled to the multiplying gear mechanism, for restricting or promoting the differential rotation by driving the multiplying gear mechanism in either direction; and a controller for controlling rotative direction and torque of the motor by adjusting supply voltage polarity and motor current magnitude. The multiplying mechanism is a strange gear mechanism or a planetary gear mechanism.

4 Claims, 5 Drawing Sheets

POWER TRANSMISSION APPARATUS

BACKGROUND OF THE INVENTION

1. Field of the Invention

The present invention relates to power transmission apparatus provided with differential limiting function, and more specifically to a power transmission apparatus which can limit and also promote differential operation between two transmission shafts.

2. Description of the Prior Art

Conventionally, the power transmission apparatus provided with differential limiting function is disclosed in Japanese Unexamined Published (Kokai) Patent Application No. 62-214021, for instance, in which power is transmitted by multiplying differential rotation produced between two input and output shafts through a planetary gear device, in order to restrict the differential rotation by a centrifugal brake.

In addition, Japanese Unexamined Published (Kokai) patent Application Nos. 56-43031 and 55-72420 disclose power transmission apparatus of wet multidisc clutch type, in which differential distribution and differential operation are restricted by a hydraulic clutch; Japanese Examined Published (Kokoku) Patent Application No. 50-53 discloses an apparatus in which a cam mechanism and a multidisc clutch are used as resistance against differential rotation; Japanese Unexamined Published (Kokai) Patent Application No. 62-165032 discloses an apparatus of viscous coupling type; further, Japanese Unexamined Published (Kokai) Patent Application No. 60-104426 and Japanese Examined Published (Kokoku) Utility Model Application No. 46-35772 disclose an apparatus using a pump, respectively. In these power transmission apparatus, however, differential function is controlled so that difference in rotation speed between the two shafts can only be reduced.

As described in more detail later, vehicles are often required to promote differential rotation between vehicle wheels, according to vehicle travelling, steering or road surface conditions, in addition to differential rotation restriction. In the prior-art power transmission apparatus of differential control type, however, since differential rotation is restricted only in the decreasing direction, there inevitably exists a limit when vehicle travelling performance is required to improve.

SUMMARY OF THE INVENTION

With these problems in mind, therefore, it is the primary object of the present invention to provide a power transmission apparatus provided with such functions that differential rotation can not only be restricted but also promoted in order to provide still broader differential rotation control or broader power transmission distribution control.

To achieve the above-mentioned object, a power transmission apparatus, according to the present invention, for differentially transmitting a rotative power supplied to an input shaft (25)(115) to first and second output shafts (33, 45) (103, 101), which comprises: (a) a differential gear mechanism (59) (119), coupled between said input shaft and said first and second output shafts, for allowing differential rotation between said two output shafts; (b) a multiplying gear mechanism (89) (115), associated with said differential gear mechanism, for detecting and multiplying a differential rotation between said two output shafts; (c) a motor (85) (161), coupled to said multiplying gear mechanism, for restricting or promoting the differential rotation by driving said multiplying gear mechanism in either direction; and (d) a controller (91), coupled to said motor, for controlling rotative direction and torque of said motor by adjusting supply voltage polarity and motor current magnitude to control the differential operation between said two output shafts.

In the power transmission apparatus of the present invention, since differential rotation between the two output shafts can be detected and further multiplied by the multiplying gear mechanism and then transmitted to the motor, it is possible to restrict or promote the differential rotation by controlling rotative direction and torque of the motor. In other words, the present invention can provide a power transmission apparatus by which broader differential rotation or broader power transmission distribution can be controlled.

BRIEF DESCRIPTION OF THE DRAWINGS

The features and advantages of the power transmission apparatus according to the present invention will be more clearly appreciated from the following description taken in conjunction with the accompanying drawings in which.

DETAILED DESCRIPTION OF THE PREFERRED EMBODIMENTS

Figure 1A:
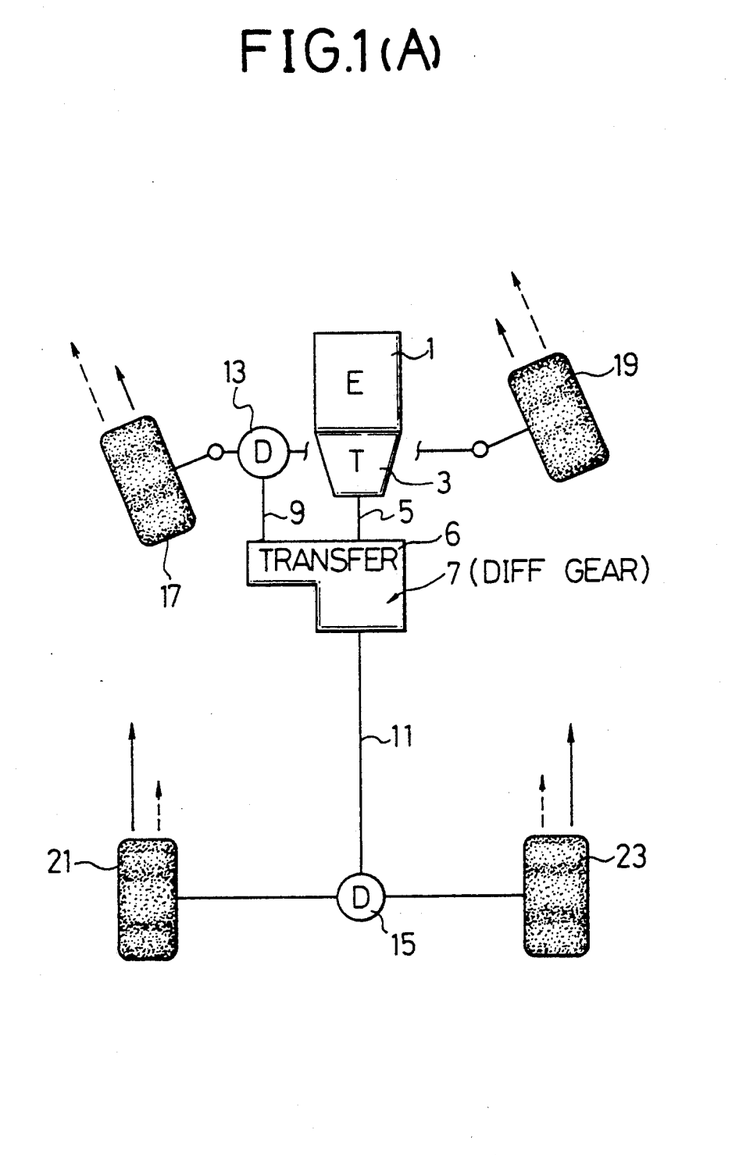
FIG. 1(A) is a diagrammatical view showing a first entire power transmission system for an automotive vehicle, to which a first embodiment of the power transmission apparatus according to the present invention is incorporated.
Figure 1B:
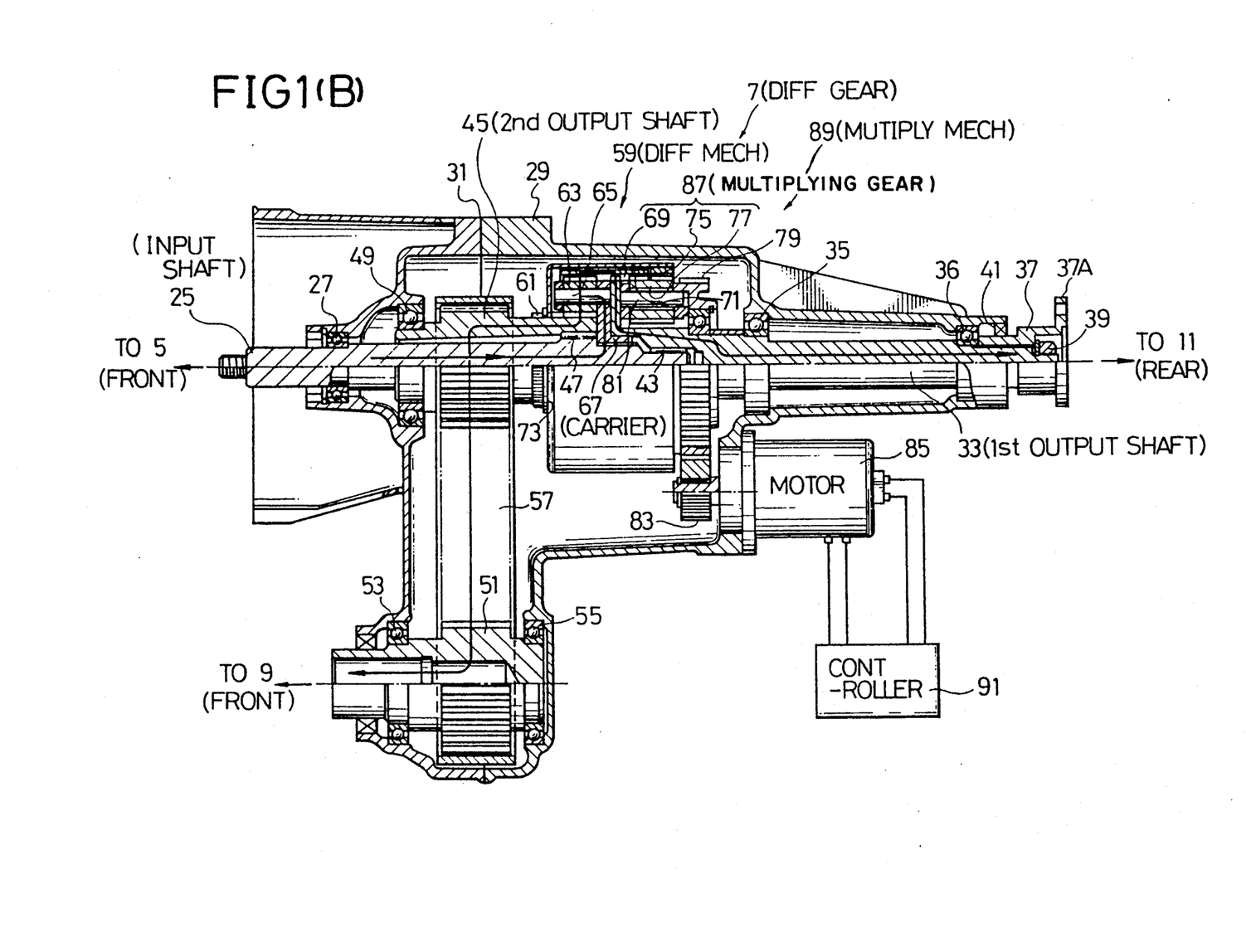
FIG. 1(B) is a cross-sectional view showing the first embodiment of the power transmission apparatus according to the present invention.

A first embodiment will be described hereinbelow with reference to FIGS. 1(A) and 1(B). This first embodiment is used for a central differential gear 7 housed within a transfer 6 of a four-wheel drive vehicle as shown in FIG. 1(A). Further, in the following description, the right and left direction in FIG. 1(B) corresponds to the vertical direction in FIG. 1(A), which corresponds to the vehicle front and rear direction.

The vehicle power transmission system will be described with reference to FIG. 1(A).

The rotative power of an engine 1 is gear changed by a transmission 3, and then transmitted to a differential gear 7 housed within a transfer 6 via an output shaft 5. The differential gear 7 (e.g. central differential gear) transmits the transmitted rotative power to a front wheel side differential gear 13 via an output shaft 9 and to a rear wheel side differential gear 15 via a propeller shaft 11. The differential gears 13 and 15 distribute, respectively vehicle driving power differentially to right and left wheels 19, 17 and 23, 21 respectively.

The construction of the power transmission apparatus of the present invention will be described hereinbelow with reference to FIG. 1(B).

An input shaft 25 connected to an output shaft 5 shown in FIG. 1(A) is rotatably supported by a transfer case 29 via a bearing 27 to receive a drive power of the engine 1 from the transmission 3. The transfer case 29 is composed of two members joined at a junction surface 31. A first output shaft 33 is also rotatably supported by the transfer case 29 via two bearings 35 and 36 coaxially with the input shaft 25. A hollow shaft 37 formed with a flange 37A is spline engaged with a rear end portion of the first output shaft 33 and fixed thereto by a lock nut 39. A seal member 41 is disposed between the hollow shaft 37 and the transfer case 29. This first output shaft 33 is coupled to the propeller shaft 11 via the flange 37A of the hollow shaft 37 to transmit a drive power to the rear wheel side differential gear 15. The front end of the first output shaft 33 is formed into a trumpet shape. Within this trumpet-shaped end, the input shaft 25 and the first output shaft 33 are coupled with each other via a needle bearing 43 so as to be rotatable relative to each other.

A hollow pulley serving as a second output shaft 45 is coaxially fitted to the input shaft 25, and rotatably supported by the input shaft 25 via a needle bearing 47 and by the transfer case 29 via a bearing 49. At one end of the transfer case 29 in the vehicle width direction, another pulley 51 is rotatably supported via bearings 53 and 55 so as to be arranged in parallel to the pulley 45. To this pulley 51, another output shaft (not shown) is spline coupled in order to transmit a drive power to the front wheel side differential gear 13 via the output shaft 9.

The surface of the pulleys 45 and 51 are formed with a groove with a constant pitch, respectively so that a timing belt 57 is stably reeved around the pulleys 45 and 51.

A differential mechanism 59 is of planetary gear type, which comprises a sun gear 61, a plurality of planetary gears 63 in mesh with the sun gear 61, a carrier 67 for rotatably supporting each of the planetary gears 63 via each of axles 65 arranged at regular angular intervals along the circumference thereof, and an inner gear 69 in mesh with the planetary gears 63. The sun gear 61 is formed integral with the right end of the pulley 45, and the carrier 67 is spline coupled to the rear end of the input shaft 25. Further, the inner gear 69 is spline coupled to the trumpet shaped end of the first output shaft 33.

Therefore, a drive power of the engine 1 inputted from the input shaft 25 rotates the sun gear 61 and the inner gear 69 via the carrier 67 and the planetary gears 63, and then transmitted to the front wheels 17 and 19 via the second output shaft (pulley) 45, the timing belt 57 and the pulley 51 and on the other hand to the rear wheels 21 and 23 via the second output shaft 33. Further, differential rotation between the first output shaft 33 (e.g. rear wheels 21 and 23) and the second output shaft or pulley 45 (e.g. front wheels 17 and 19) can be absorbed by the rotation around the axles 65 and the orbital motion around the shaft 25 (the revolution of the carrier 67) of the planetary gears 63.

A coupling member 71 having a cylindrical side wall is engaged with the pulley 45 on the left side of the engagement portion between the sun gear 61 and the planetary gears 63. The axial (thrust) motion of the coupling member 71 is stopped by a stopper ring 73. Another inner gear 75 is fixed to the inner circumference surface of the right side end of this coupling member 71 so as to be arranged side by side with the inner gear 69 of the differential mechanism 59. The number of teeth of the inner gear 75 is different by several teeth from that of the inner gear 69. Other planetary gears 77 are in mesh with these two inner gears 69 and 75. The planetary gears 77 are rotatably supported by axles 81 arranged at regular angular intervals on the side surface of a large diameter gear 79 geared with a small diameter gear 83 whose number of gears is one-third or fourth of that of the large diameter gear 79. This small diameter gear 83 is coupled to a rotor shaft of a DC motor 85 (e.g. torque generator).

A multiplying gear 87 is composed of the two inner gears 69 and 75 and the planetary gears 77. Further a rotation detecting mechanism 89, (e.g. multiplying gear mechanism) is composed of this multiplying gear 87 and the two large and small diameter gears 79 and 83. A differential rotation amplified by the multiplying gear 87 is further amplified by several times in dependence upon a ratio of the number of gears between the large and small gears 79 and 83 to rotate a rotor of a DC motor 5 via the small gear 83. As described above, this multiplying gear mechanism (rotation detecting mechanism) 89 converts and multiplies a differential rotation into a rotational force. Therefore, the number of the differential revolutions between the first output shaft 33 and the second output shaft 45 can be amplified to several ten times by this rotation detecting mechanism 89 and then outputted to the DC motor 85.

The DC motor 85 is fixed to the transfer case 29 and connected to a controller 91 which controls the rotational (on-off) motion, the rotational direction, the output torque, etc. of the DC motor 85 by controlling the polarity of the power source and the magnitude of the current passed through the DC motor 85. This controller 91 is operated manually by the driver or automatically in response to signals supplied by sensors for detecting travel or steering conditions. Further, when the DC motor 85 is not driven, this DC motor 85 serves as a dynamo (generator) which can brake the differential motion of the differential gear mechanism 59.

The function will be described hereinbelow: A rotative drive power of the engine 1 supplied to the input shaft 25 is transmitted to the first output shaft 33 and the second output shaft (pulley) 45 via the differential mechanism 59. When differential rotation occurs between the two output shafts 33 and 45, that is, between the two inner gears 69 and 75, the differential rotational speed is amplified by the multiplying gear mechanism (rotation detecting mechanism) 89 and then outputted to the rotor of the DC motor 85 via the small-diameter gear 83. In this case, since the DC motor 85 is operated as a dynamo (i.e. generator), a torque is applied to the small diameter gear 83 from the motor 85. Therefore, this torque is amplified by the multiplying gear mechanism (rotation detecting mechanism) 89 to restrict the differential operation of the differential mechanism 59. On the other hand, when the motor 85 is driven by the controller 91, since the motor torque is applied to the multiplying gear mechanism 89, the differential operation can be promoted. In this case, the differential operation between the two output shafts 25 and 33 can be controlled by the rotation direction of the DC motor 85. For instance, when the DC motor 85 is rotated clockwise, the first shafts 33 rotates at speed higher than the second shaft 45. When the DC motor 85 is rotated counterclockwise, the first shafts 33 rotates at speed lower than the second shaft 45. The above relationship between the revolving speeds of the two output shafts 33 and 45 can be determined by the difference in the number of teeth between the two inner gears 69 and 75 both in mesh with the same planetary gears 77.

The function of the apparatus will be described in relation to the vehicle performance.

If the differential rotation between the output shaft 9 (second output shaft 45) and the propeller shaft 11 (first output shaft 33) is restricted or stopped by the differential gear 7, it is possible to prevent drive power from being transmitted to either of the front wheels 17, 19 or the rear wheels 21 and 23 when the vehicle travels on bad or rough roads in which road surface resistance to the vehicle wheels changes violently. In other words, it is possible to prevent vehicle stuck conditions.

When the differential rotation stops perfectly into lock conditions, the same power is transmitted to the second output shaft 45 (the front wheels 17 and 19) and the first output shaft 33 (the rear wheels 21 and 23) simultaneously. Therefore, in case the front wheels 17 and 19 or the rear wheels 21 and 23 slip, since a drive power is transmitted to the non-slipping wheels, it is possible to improve the vehicle extricability from a muddy road. For instance, when the front wheels 17 and 19 slip as shown by dashed lines, the rear wheels 21 and 23 are driven as shown by solid lines in FIG. 1(A). On the other hand, when the rear wheels 21 and 23 slip as shown by dashed lines, the front wheels 17 and 19 are driven as shown by solid lines in FIG. 1(A). When the differential rotation is stopped by a restriction torque, the differential mechanism 59 is locked. Further, when the DC motor 85 is rotated to assist the differential rotation, the differential rotation is promoted. In the prior-art differential gear provided with differential restriction function, a drive power is adjustably distributed by only restricting the differential rotation. In the embodiment of the present invention, however, the diffferential gear 7 can not only restrict but also promote the differential rotation as described above. Therefore, when the front wheels slip, for instance, it is possible to not only reduce the differential rotation between the front and rear wheels to zero, but also positively transmit a torque to the rear wheels for allowing the vehicle to be more smoothly extricated from a muddy road.

Figure 2A:
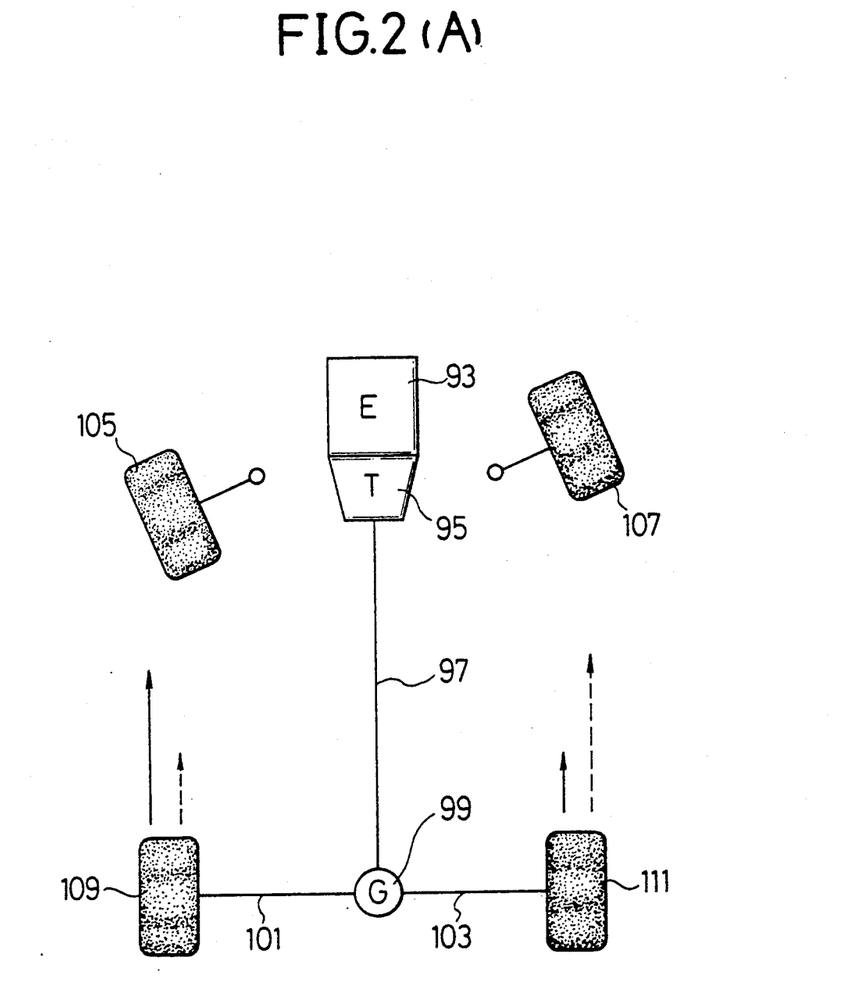
FIG. 2(A) is a diagrammatical views showing a second entire power transmission system for an automotive vehicle, to which a second embodiment of the power transmission apparatus according to the present invention is incorporated.
Figure 2B:
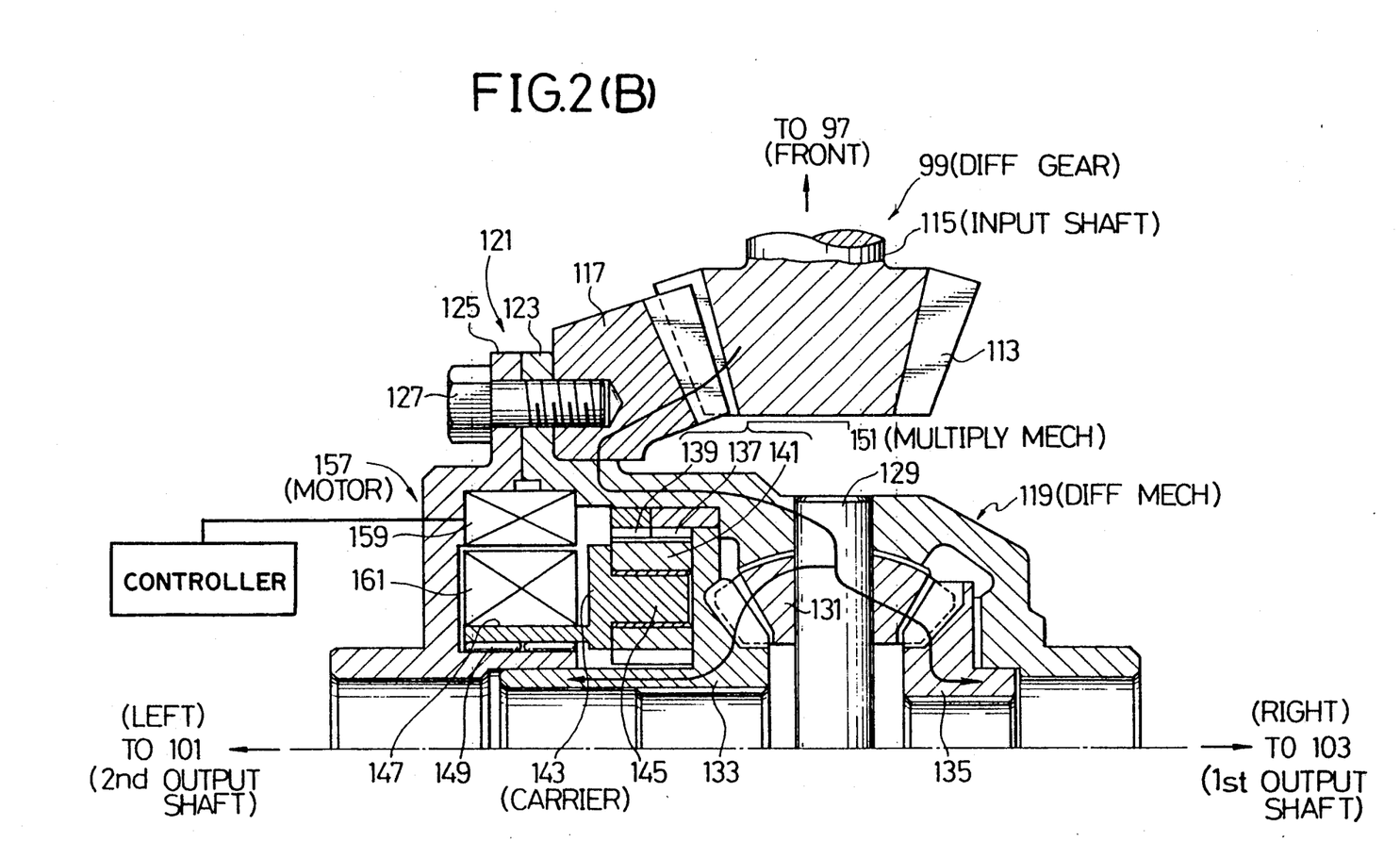
FIG. 2(B) is a cross-sectional view showing the second embodiment of the power transmission apparatus according to the present invention.

A second embodiment of the present invention will be described hereinbelow with reference to FIGS. 2(A) and 2(B). As shown in FIG. 2(A), this embodiment is used as a differential gear for rear wheels of a front-engine rear-drive (FR) two-wheel drive (2WD) vehicle. Further, in the following description, the right and left direction in FIG. 2(B) corresponds to the horizontal direction in FIG. 2(A), which corresponds to the vehicle right and left direction. The power transmission system of the vehicle will be explained with reference to FIG. 2(A).

A drive power of an engine 93 is gear changed by a transmission 95 and then transmitted to a rear wheel side differential gear 99 of this embodiment via a propeller shaft 97. The differential gear 99 transmits the gear changed power to right and left rear wheels 111 and 109 via right and left rear wheel shafts 103 and 101. The two front wheels 105 and 107 are used only for steering motion.

The construction of the differential gear 99 of the present invention will be explained hereinbelow.

A drive pinion gear 113 is fixed to a rear end of a transmission (input) shaft 115 coupled to the propeller shaft 97 and in mesh with a ring gear 117.

A differential mechanism 119 of the differential gear 99 is of bevel gear type. A differential case 121 is composed of a case body 123 and a cover 125 and rotatably supported by a differential carrier via a bearing (both not shown). The case body 123, the cover 125, and the ring gear 117 are fastened together by bolts 127. A pinion shaft 129 is supported by the case body 123 of the differential case 121. Two pinion gears 131 are rotatably supported by the pinion shaft 129 within the differential case 121. The pinion gear 131 is in mesh with two side gears 133 and 135 arranged rotatably relative to each other and coaxially with the differential case 121. Further, the first side gear 135 is spline coupled to a first output shaft (not shown) connected to the right rear wheel shaft 103, and the second side gear 133 is spline coupled to a second output shaft (not shown) connected to the left rear wheel shaft 101, respectively.

An inner gear 137 is fixed to the lefthand side gear 133, and another inner gear 139 is fixed to the inner circumferential surface of the case body 123. The number of gears of the inner gear 137 is different by several teeth from that of the inner gear 139. These two inner gears 137 and 139 are in mesh with a plurality of planetary gears 141 rotatably supported by a plurality of axles 145 arranged at regular angular intervals on the circumferential side surface of the carrier 143. The left end of the carrier 143 is formed into a hollow shaft 147 and rotatably supported by the differential case 121 via a bearing 149. A strange gear mechanism 151 (i.e. multiplying gear mechanism) is composed of the two inner gears 137 and 139, the planetary gears 141 and the carrier 143. A differential rotation produced between the two inner gears 137 and 139 rotates the planetary gears 141 around the center of the differential gear 99 to rotate the carrier 143. Further, the rotation of the carrier 143 allows the two inner gears 137 and 139 to be rotated differentially. Therefore, the multiplying gear or the multiplying gear mechanism 151 serves as a rotation detecting mechanism. In this rotation detecting mechanism, when the differential rotation between the two inner gears 137 and 139 is converted into the rotation of the carrier 143 in dependence upon the characteristics of the multiplying gear 151, the number of the revolution is amplified by several ten times, so that torque is amplified by several ten times when the rotation of the carrier 143 is converted into the differential rotation between the two inner gears 137 and 139.

A DC motor 157 is arranged within the differential case 121. A stator 159 is fixed to the differential case 121, and a rotor 161 is fixedly fitted to the hollow shaft 147 of the carrier 143. The DC motor 157 is connected to a controller in the same way as in the first embodiment shown in FIG. 1(B) via slip rings (not shown).

The controller is operated manually by the driver or automatically in response to signals supplied from sensors for detecting vehicle travelling and steering conditions. The rotational (on-off) motion, the rotational direction, the output torque, etc. of the DC motor 157 are adjusted by controlling the polarity of the power source and the magnitude of the current passed through the DC motor 157.

The differential gear 99 is composed of the differential gear mechanism 119, the rotation detecting mechanism (i.e multiplying gear or multiplying gear mechanism 151), the DC motor 157, and the controller.

The function of the second embodiment will be described hereinbelow.

A drive power of the engine 93 rotates the differential case 121 via the drive pinion gear 113 and the ring gear 117, and then transmitted to the right and left rear wheels 111 and 109 by way of the pinion shaft 129, the pinion gear 131, the right and left side gears 135 and 133 and the right and left rear wheel shafts 103 and 101. When a differential rotation is produced between the right and left rear wheels 111 and 109, the pinion gear 131 rotates to allow the two inner gears 137 and 139 to be rotated differentially via the differential case 121 and the left side gear 133. This differential rotation is amplified and converted into a rotational force by the rotation detecting mechanism (multiplying gear mechanism) 151 and then outputted to the rotor 161 of the DC motor 157 via the carrier 143 and the hollow shaft 145. In this case, when the power supply to the DC motor 157 is interrupted by an external operation, this DC motor 157 serves as a dynamo to restrict the torque. Further, the restricted torque corresponding to the electromotive force is amplified several ten times by the rotation detecting mechanism 151 in order to restrict the differential rotation of the right and left rear wheels 111 and 109 via the differential mechanism 119. Further, when the rotational direction of the DC motor 157 is switched to the differential rotation direction of the differential mechanism 119 by an external operation, it is possible to promote the differential rotation because the rotation detecting mechanism 151 generates a rotational force whose direction is the same as the direction of the differential rotation. In other words, it is possible to freely adjust the degree of the differential operation by increasing or decreasing the torque of the DC motor 157. As described above, in this embodiment, it is possible to not only control the differential rotation over a wide range from the torque restriction to the torque promotion, but also to freely determine the degree or amount of the torque restriction and promotion.

The function of this embodiment will be described in relation to the vehicle performance.

When the differential rotation of the differential gear 99 is required to be restricted by an external operation, it is possible to prevent one of the rear wheels from slipping during muddy road travelling and therefore to improve the vehicle travelling capabilitiy.

When the vehicle is turned to the left as shown in FIG. 2(A), if the distribution ratio of drive power between the right and left rear wheels 111 and 109 is adjusted by the differential gear 99; for instance, if the drive power of the left rear wheel 109 is determined larger than that of the right rear wheel 111 as shown by solid lines in FIG. 2(A), it is possible to decrease the yawing moment of when the vehicle is turned to the left and therefore to change the vehicle travelling condition into under-steering motion. On the other hand, if the distribution ratio is reversed, since the vehicle left-turning operation is promoted as shown by dashed lines in FIG. 2(A), the vehicle travelling conditions change into over-steering motion. That is, since it is possible to select a wide distribution ratio of the drive power, it is possible to control the steering characteristics over a wide range. Here, "under steering" implies that the radius of vehicle turning curvature increases with increasing vehicle turning speed, and "over steering" implies that the radius of vehicle turning curvature dangerously decreases with increasing vehicle turning speed.

Further, when the vehicle is travelling on a straight road, if the vehicle is controlled so that the yawing moment due to disturbance can be cancelled, it is possible to improve vehicle travelling stability. Further, when the vehicle is travelling along a corner, it is possible to improve the vehicle stability and the steerability by controlling the vehicle steering characteristics on the basis of vehicle behavior such as cornering speed, acceleration, braking, etc. in the initial, intermediate and end periods of cornering operation.

Figure 3:
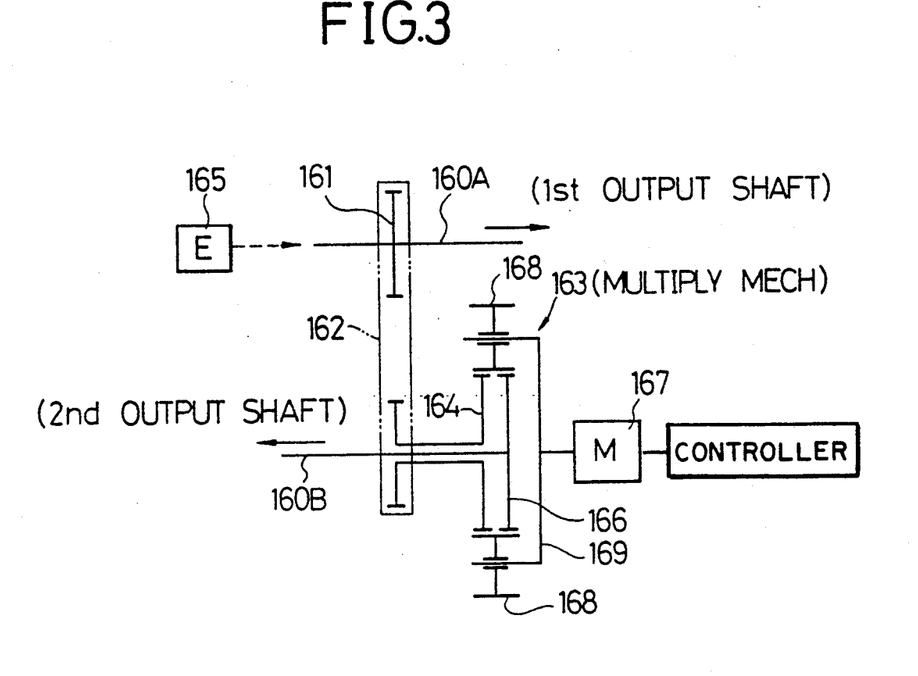
FIG. 3 is a diagrammatical view showing a third embodiment of the power transmission apparatus according to the present invention.
Figure 4:
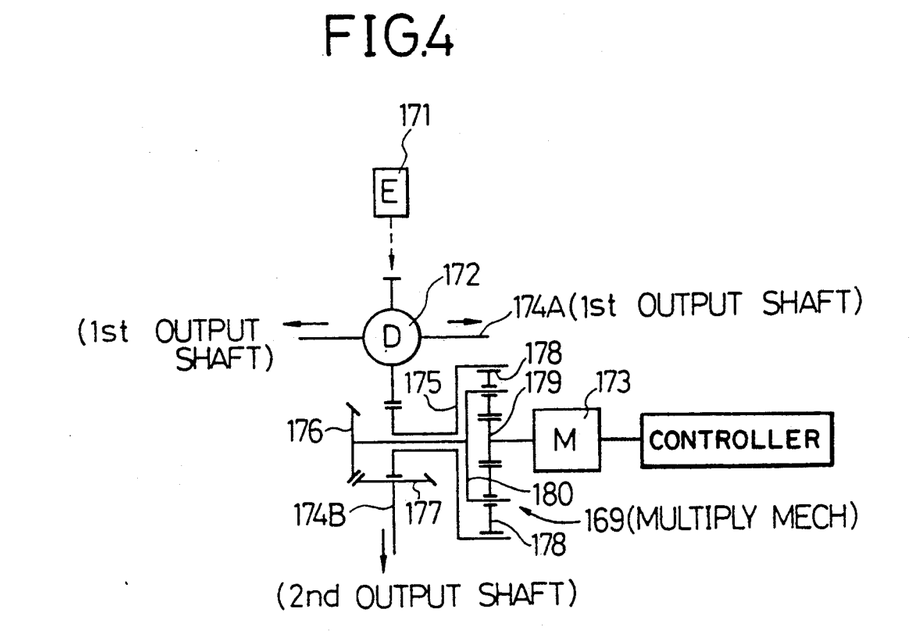
FIG. 4 is a similar diagrammatical view showing a fourth embodiment of the power transmission apparatus according to the present invention.

FIGS. 3 and 4 show other embodiments of the present invention. These two apparatus are used as a central differential gear for a four-wheel drive vehicle, in which an engine drive power is directly transmitted to a first output (front wheel) shaft as it is, and to a second output (rear wheel) shaft via a multiplying gear mechanism for multiplying the differential rotation between the first and second (front and rear wheel) shafts to control it by a motor. Therefore, if the motor resistance is allowed free (zero), no power is transmitted to the second output shaft; if the motor is rotated at the same speed as the first output shaft, the second output shaft rotates at the same speed as the first output shaft; if the motor is rotated at a speed higher than the first output shaft, the second output shaft rotates at speed higher than the first output shaft.

In the apparatus shown in FIG. 3, a multiplying gear mechanism 163 constitutes a rotation detecting mechanism or multiplying mechanism. A drive power of an engine 165 is inputted as shown by a dashed line arrow, and transmitted to a first output shaft 160A as it is, and to a second output shaft 160B via the multiplying gear mechanism (multiplying mechanism) 163 as shown by solid line arrows. In more detail, the rotation of the first output shaft 160A is transmitted from a gear 161 to a first gear 164 via a chain 162. This first gear 164 coupled to the first output shaft 160A and a second gear 166 coupled to the second output shaft 160B are both in mesh with planetary gears 168 rotatably supported on a carrier 169 at regular angular intervals. The number of teeth of the first gear 164 is different from that of the second gear 166. The carrier 169 is connected to a motor 167. Therefore, the differential rotation between the first and second output shafts 160A and 160B can be detected and multiplied by the multiplying gear mechanism and then controlled by the motor 167 so as to be restricted or promoted.

In the apparatus shown in FIG. 4, a planetary gear assembly 169 constitutes a rotation detecting mechanism or a multiplying mechanism. A drive power of an engine 171 is inputted as shown by a dashed line arrow, and transmitted to a first output shaft 174A as it is via a front differential gear 172 and to a second output shaft 174B via a planetary gear assembly (multiplying mechanism) 169 as shown by solid line arrows.

In more detail, the rotation of the first output shaft 174A is transmitted to a large-diameter inner gear 175. A carrier 180 is connected to the second output shaft 174B via first and second bevel gears 176 and 177. A plurality of planetary gears 178 are rotatably supported on the carrier 180 at regular angular intervals so as to be geared with the large diameter inner gear 175. A sun gear 179 connected to a motor 173 is in mesh with the planetary gears 178. Therefore, the differential rotation between the first and second output shafts 174A and 174B can be detected and amplified by the planetary gear assembly 169 and then controlled by the motor 167 so as to be restricted or promoted. Since the rotation detecting mechanism serving as the multiplying mechanism is provided with torque amplifying function, it is possible to use a small-sized DC or AC motor, thus allowing the apparatus size to be compact.

As described above, the power transmission apparatus of the present invention can be controlled within a wide range from the restriction to the promotion of the differential rotation between the two shafts and further can change the degree of power transmission distribution. Therefore, when incorporated in the vehicle power transmission system, it is possible to improve not only the vehicle stability and vehicle travelling capability but also the vehicle steerability because any given steering characteristics can be determined freely over a wide range.

What is claimed is:

1. A power transmission apparatus for differentially transmitting rotative power supplied to an input shaft to first and second output shafts, which comprises:
   (a) a differential gear mechanism coupled between said input shaft and said first and second output shafts, for allowing differential rotation between said two output shafts, said differential gear mechanism including:
      (1) a carrier rotatably fixed to said input shaft;
      (2) first planetary gears rotatably supported on said carrier at regular angular intervals; and
      (3) a sun gear rotatably fixed to said second output shaft and in mesh with said first planetary gears;
   (b) a multiplying gear mechanism associated with said differential gear mechanism, for detecting and multiplying a differential rotation between said two output shafts, said multiplying gear mechanism including:
      (1) a first inner gear drivingly connected to said first output shaft and in mesh with said first planetary gears;
      (2) a second inner gear arranged side by side with said first inner gear and drivingly connected to said second output shaft, the number of teeth of said second inner gear being different from that of said first inner gear;
      (3) a large diameter gear rotatably supported by the first output shaft;
      (4) second planetary gears rotatably supported on said large diameter gear at regular angular intervals and in mesh with said first and second inner gears; and
      (5) a small diameter gear driven by an electrically powered motor and in mesh with said large diameter gear;
   (c) said electrically powered motor coupled to said multiplying gear mechanism, for alternatively restricting and promoting the differential rotation by driving said multiplying gear mechanism in any one of differential rotation restricting and promoting directions; and
   (d) a controller coupled to said motor, for controlling rotative direction and torque of said motor by adjusting supply voltage polarity and motor current magnitude to control the differential operation between said two output shafts.

2. A power transmission apparatus for differentially transmitting rotative power supplied to an input shaft to first and second output shafts, which comprises:
   (a) a differential gear mechanism coupled between said input shaft and said first and second output shafts, for allowing differential rotation between said two output shafts, said differential gear mechanism including:
      (1) a drive pinion gear rotatably fixed to the input shaft;
      (2) a differential case formed with a ring gear engaged with said drive pinion gear so as to be rotated;
      (3) pinion gears rotatably housed within said differential case;
      (4) a first side gear rotatably fixed to and first output shaft; and
      (5) a second side gear rotatably fixed to the second output shaft;
   (b) a multiplying gear mechanism associated with said differential gear mechanism, for detecting and multiplying a differential rotation between said two output shafts, said multiplying gear mechanism including:
      (1) a first inner gear fixed to said differential case;
      (2) a second inner gear fixed to said second side gear, the number of teeth of said second inner gear being different from that of said first inner gear;
      (3) a carrier rotatably supported and driven by an motor; and
      (4) planetary gears rotatably supported on said carrier at regular angular intervals and in mesh with said first and second inner gears;
   (c) said electrically powered motor coupled to said multiplying gear mechanism, for alternatively restricting and promoting the differential rotation by driving said multiplying gear mechanism in any one of differential rotation restricting and promoting directions; and
   (d) a controller coupled to said motor, for controlling rotative direction and torque of said motor by adjusting supply voltage polarity and motor current magnitude to control the differential operation between said two output shafts.

3. A power transmission apparatus for transmitting engine power to the front and rear wheels of a four-wheel drive vehicle, comprising:
   (a) a first output shaft directly driven by the engine power;
   (b) a second output shaft rotatable relative to said first output shaft;
   (c) a multiplying gear mechanism disposed between said first output shaft and said second output shaft, for allowing relative rotation between said first and second output shafts, said multiplying gear mechanism including:
      (1) a first gear rotatably coupled to said first output shaft;
      (2) a second gear rigidly fixed to said second output shaft, the number of teeth of said second gear being different from that of said first gear;
      (3) a carrier rotatably supported and driven by an electrically powered motor; and
      (4) planetary gears rotatably supported on said carrier at regular angular intervals and in mesh with said first and second gears;
   (d) said electrically powered motor coupled to said multiplying gear mechanism, for alternatively restricting and promoting said relative rotation by driving said multiplying gear mechanism in any one of relative rotation restricting and promoting directions; and (e) a controller coupled to said motor, for controlling rotative direction and torque to said motor by adjusting supply voltage polarity and motor current magnitude to control differential operation between said two output shafts.

4. A power transmission apparatus for transmitting engine power to the front and rear wheels of a four-wheel drive vehicle, comprising:

(a) a first output shaft directly driven by the engine power;

(b) a second output shaft rotatable relative to said first output shaft;

(c) a multiplying gear mechanism disposed between said first output shaft and said second output shaft, for allowing relative rotation between said first and second output shafts, said multiplying gear mechanism including:

(1) a large-diameter inner gear rotatably connected to said first output shaft;

(2) a carrier rotatably connected to said second output shaft;

(3) planetary gears rotatably supported on said carrier at regular angular intervals and in mesh with said large-diameter inner gear; and (4) a sun gear driven by an electrically powered motor and in mesh with said planetary gears;

(d) said electrically powered motor coupled to said multiplying gear mechanism, for alternatively restricting and promoting said relative rotation by driving said multiplying gear mechanism in any one of relative rotation restricting and promoting directions; and (e) a controller coupled to said motor, for controlling rotative direction and torque to said motor by adjusting supply voltage polarity and motor current magnitude to control differential operation between said two output shafts.

* * * * *